US006325266B1

(12) United States Patent
Suzuki

(10) Patent No.: US 6,325,266 B1
(45) Date of Patent: Dec. 4, 2001

(54) AUTOMATIC PAPER-THREADING DEVICE FOR USE IN ANGLE BAR SECTION

(75) Inventor: Kunio Suzuki, Yokohama (JP)

(73) Assignee: Tokyo Kikai Seisakusho, Ltd., Tokyo (JP)

( * ) Notice: Subject to any disclaimer, the term of this patent is extended or adjusted under 35 U.S.C. 154(b) by 0 days.

(21) Appl. No.: 09/480,864

(22) Filed: Jan. 11, 2000

(30) Foreign Application Priority Data

Aug. 16, 1999 (JP) ........................................ 11-229533

(51) Int. Cl.[7] ........................................ G03B 1/56
(52) U.S. Cl. ........................ 226/92; 242/615.21; 101/223
(58) Field of Search .................. 226/91, 92; 242/615.21; 101/223

(56) References Cited

U.S. PATENT DOCUMENTS 4,063,505 * 12/1977 Sasamoto et al. ................. 226/91 X
4,154,386 * 5/1979 Kawada ................................ 226/91
4,370,927 * 2/1983 Fischer .............................. 226/92 X
5,052,295 * 10/1991 Suzuki et al. ...................... 226/92 X
5,307,970 * 5/1994 Shibuya et al. ........................ 226/92
5,397,044 * 3/1995 Suzuki .................................. 226/92
5,400,940 * 3/1995 Sato et al. ............................. 226/92
5,520,317 * 5/1996 Eckert et al. ........................ 226/197
6,105,496 * 8/2000 Mayr ................................. 226/92 X

FOREIGN PATENT DOCUMENTS 7-39646 9/1995 (JP) .

* cited by examiner

*Primary Examiner*—Michael R. Mansen
(74) *Attorney, Agent, or Firm*—Armstrong, Westerman, Hattori, McLeland & Naughton, LLP

(57) ABSTRACT

An automatic paper-threading device for use in an angle bar section of a rotary press which includes a paper web supply unit, a press unit, an angle bar section, and a folding unit and which has a paper-threading path for paper web formed between the paper web supply unit and the folding unit. The angle bar section is disposed in the paper-threading path and includes a first bar and a second bar disposed in parallel and separated by an appropriate distance. The automatic paper-threading device includes a paper leader guide and a tensioner. The paper leader guide includes a drive unit for moving along the paper-threading path a paper leader affixed to a leading end portion of paper web. The tensioner is provided in the angle bar section and includes a paper guide which is disposed between the first bar and the second bar to extend the widthwise direction of the paper web. The paper guide is moved between a standby position where the paper guide does not interfere with the paper-threading path and a projection position where the paper guide projects across the paper-threading path to thereby urge the paper web outward.

12 Claims, 12 Drawing Sheets

AUTOMATIC PAPER-THREADING DEVICE FOR USE IN ANGLE BAR SECTION

BACKGROUND OF THE INVENTION

1. Field of the Invention

The present invention relates to a paper-threading device for threading paper web along a paper-threading path, along which paper web travels during operation of a rotary press. More particularly, the invention relates to a paper-threading device for threading paper web along an angle-bar paper-threading path by means of moving a paper leader to which paper web is affixed, along a paper-leader guide provided along the angle-bar paper-threading path, which extends around angle bars while changing direction at each angle bar.

2. Description of the Related Art

A conventional automatic paper-threading device for use in an angle bar section of a rotary press is disclosed in, for example, Japanese Utility Model Publication (kokoku) No. 7-39646.

This automatic paper-threading device includes a guide pipe having a cross section shaped like the letter C and a paper-threading rope movably accommodated in the guide pipe. The guide pipe is provided along an angle-bar paper-threading path, which extends around angle bars while changing direction at each angle bar. A joint is attached to the paper-threading rope in such a manner as to be projected through a slit formed in the guide pipe. A paper web leader made from a film material is attached to the joint. A leading end portion of paper web is affixed to the paper web leader. The paper-threading rope is caused to travel through the guide pipe by means of a driving roller and an auxiliary roller, between which the paper-threading rope is held, thereby threading paper web along the angle-bar paper-threading path.

The paper-threading rope stands by at a position which is located upstream of the angle-bar paper-threading path and downstream of a slitter with respect to a traveling direction of paper web. The slitter slits paper web into two paper web strips. One paper web strip is transported by the paper-threading rope. When a sensor detects a leading end portion of the paper web strip, an affixing device is operated so as to affix the leading end portion of the paper web strip to the paper web leader. Thus, the paper web strip is threaded along the angle-bar paper-threading path.

As shown in FIG. 18, which shows the above-described conventional automatic paper-threading device, a gap must be provided between a guide pipe 9*b* and angle bars (first bar 23 and second bar 24). Thus, the guide pipe 9*b* extends along a route which is more distant from the angle bars than is the actual paper-threading path for a paper web strip 1*c*. As a result, as the paper web strip 1*c* passes the first bar 23 and then the second bar 24, its slack increases. Also, the paper web strip 1*c* tends to be drawn toward a paper-threading rope 10*b*. Specifically, when the leading end portion of the paper web strip 1*c* passes the first bar 23, a force acts on the paper web strip 1*c* in the direction of arrow m, since a force of pulling the paper-threading rope 10*b*, or a force directed in the direction of arrow k, is produced at the center of the guide pipe 9*b*.

A component force directed in the direction of arrow n of the above-mentioned force directed in the direction of arrow m causes the paper web strip 1*c* to move in the direction of arrow n while traveling in the moving direction of the paper-threading rope 10*b* (in the direction of arrow k). In an initial stage of a paper-threading process, an obliquely cut end portion of the paper web strip 1*c* is in contact with the first bar 23; in other words, the paper web strip 1*c* is not in contact with the first bar 23 across the entire width thereof. Accordingly, the contact area between the paper web strip 1*c* and the first bar 23 is small, and the paper web strip 1*c* is slack. Thus, a frictional resistance generated between the paper web strip 1*c* and the first bar 23 is low, so that the paper web strip 1*c* easily shifts on the first bar 23 in the direction of arrow q.

Because of the above-described two reasons, when the paper web strip 1*c* is threaded along the angle-bar paper-threading path while being looped around the first bar 23 and the second bar 24, the paper web strip 1*c* is drawn toward the paper-threading rope 10*b*. In some cases, the thus-drawn side edge of the paper web strip 1*c* may be caught between the paper-threading rope 10*b* and a driving roller 18*a* of a drive unit 18.

As a result of the obliquely cut leading end portion of the paper web strip 1*c* being drawn toward the paper-threading rope 10*b*, the above-mentioned slack of the end portion emerges in the form of waves in the longitudinal or lateral direction of the paper web strip 1*c*. Upon contact with the first bar 23 and the second bar 24, these waves become wrinkles, causing a nonuniform tension to act on the end portion, which is narrower than the regular width of the paper web strip 1*c*. As a result, the end portion may be torn.

Since the paper web strip 1*c* must be affixed to the paper web leader of the paper-threading rope 10*b* by means of an affixing device 43 (see FIG. 17) at a position located upstream of the first bar 23, the distance between a side edge of the paper-threading path and the guide pipe 9*b*, through which the paper-threading rope 10*b* travels, is narrower than that at a position located downstream of the second bar 24. Accordingly, as the paper web strip 1*c* is looped around the first bar 23 and then the second bar 24, the paper web strip 1*c* deviates increasingly farther from the paper-threading path.

Specifically, as shown in FIG. 18, the letter "H" represents the distance between the center of the paper-threading rope 10*b* and a side edge of the paper-threading path for the paper web strip 1*c* as measured in the vicinity of the affixing device 43; the letter "I" represents that as measured at a position located between the first bar 23 and the second bar 24; and the letter "J" represents that as measured at a position located downstream of the second bar 24. The distances H, I, and J exhibit the relationship "H<I<J," indicating that the distance increases as the paper web strip 1*c* travels forward. The letter "r" denotes the locus of an end portion p of the paper web strip 1*c* along the angle-bar paper-threading path.

The paper web strip 1*c* gradually deviates from the paper-threading path as it is threaded forward while being guided by the paper-threading rope 10*b*. However, the conventional automatic paper-threading device provides no particular measure against this.

SUMMARY OF THE INVENTION

The present invention has been achieved to solve the above problems involved in the conventional automatic paper-threading device, and an object of the invention is to provide an automatic paper-threading device capable of preventing, through employment of a simple mechanism, the occurrence of slack in a paper web strip threaded through an angle bar section to thereby prevent a considerable deviation of the paper web strip from a paper-threading path which would otherwise result from such slack, and thus avoid various problems which would otherwise result from such deviation.

Another object of the present invention is to provide an automatic paper-threading device capable of preventing the occurrence of slack-derived waves on a wave paper strip, to thereby prevent the imposition of a nonuniform tension on the paper web strip and thus prevent tearing of the wave paper strip which would otherwise result from the imposition of a nonuniform tension.

To achieve the above objects, the present invention provides an automatic paper-threading device for use in an angle bar section of a rotary press which includes a paper web supply unit, a press unit, an angle bar section, and a folding unit and which has a paper-threading path for paper web formed between the paper web supply unit and the folding unit. The angle bar section is disposed in the paper-threading path and includes a first bar and a second bar disposed in parallel and separated by an appropriate distance. The automatic paper-threading device includes a paper leader guide and a tensioner. The paper leader guide includes a drive unit for moving along the paper-threading path a paper leader affixed to a leading end portion of paper web. The tensioner is provided in the angle bar section and includes a paper guide which is disposed between the first bar and the second bar to extend the widthwise direction of the paper web. The paper guide is moved between a standby position where the paper guide does not interfere with the paper-threading path and a projection position where the paper guide projects across the paper-threading path to thereby urge the paper web outward.

The present invention further provides an automatic paper-threading device for use in an angle bar section of a rotary press which comprises a paper web supply unit, a press unit, a slitting unit, an angle bar section, and a folding unit. In the rotary press, a first paper-threading path for paper web is formed between the paper web supply unit and the slitting unit via the press unit, and second and third paper-threading paths for first and second paper web strips coming from the slitting unit are formed between the slitting unit and the folding unit. The angle bar section is disposed in the third paper-threading path for the second paper web strip and comprises a first bar and a second bar disposed in parallel with an appropriate separation therebetween and inclined with respect to a paper-threading direction. The paper-threading device comprises a first paper leader guide comprising a drive unit for moving along the second paper-threading path a first paper leader affixed to a leading end portion of the first paper web strip; a second paper leader guide comprising a drive unit for moving along the third paper-threading path a second paper leader affixed to a leading end portion of the second paper web strip; and a tensioner provided in the angle bar section. The tensioner comprises a paper guide which is disposed between the first bar and the second bar to extend in the width direction of the second paper web strip. The paper guide is moved between a standby position where the paper guide does not interfere with the third paper-threading path and a projection position where the paper guide projects across the third paper-threading path to thereby urge the second paper web strip outward.

Preferably, the paper guide of the tensioner is a bar-like member extending in the width direction of paper web or paper web strip and capable of pivoting between the standby position where the bar-like member does not interfere with the paper-threading path and the projection position where an end portion of the bar-like member located on the side of the paper leader guide projects across the paper-threading path. Control/drive means effects this pivoting action; specifically, causes the paper guide to project at an appropriate timing after the leading end of paper web or paper web strip has passed the second bar located downstream of the first bar in the angle bar section.

Preferably, the first paper leader and the first paper leader guide for the first paper web strip are those used for the paper web before being slit into the first and second paper web strips; and the second paper leader guide for the second paper web strip is provided such that the starting point thereof is located immediately downstream of the slitting unit and on the side of the cut side edge of the second paper web strip.

In preparation for threading paper web into a rotary press before start of printing, the following preparatory work is carried out. First, the drive unit is rotated in reverse so as to move the paper leader—to which a leading end portion of paper web is affixed—along the paper leader guide in the reverse direction of a paper-threading operation until the paper leader reaches its standby position located immediately downstream of the paper web supply unit or the slitting unit. In the above-described movement of the paper leader, the end portion thereof to which the paper web is to be affixed becomes a leading end.

A leading end portion of paper web extending from the paper web supply unit is affixed to the end portion of the paper leader, which is positioned at the standby position of the paper web supply unit serving as a starting point of the paper-threading path.

Upon completion of the above-described preparation for a paper-threading operation, a paper feeder is operated at a predetermined speed, and the drive unit provided along the paper-threading path formed by the paper leader guide is started. Accordingly, the paper leader travels downstream along the paper leader guide at a speed synchronous with that of paper web which is caused to travel forward by the paper feeder. Paper web is thus threaded along a predetermined paper-threading path extending through the press unit and the slitting unit.

Passing through the slitting unit, paper web is slit longitudinally at the center of the width thereof, thereby being divided into two paper web strips.

One of the two paper web strips remains affixed to the paper leader, which keeps traveling along the paper leader guide; thus, the paper web strip keeps traveling along the predetermined paper-threading path.

A leading end portion of the other paper web strip is affixed to an end portion of another paper leader which stands by at a position located immediately downstream of the center of the slitting unit.

A paper leader guide for the standby paper leader has its starting point located immediately downstream of the center of the slitting unit and is equipped with a drive unit for moving the paper leader. When the drive unit is started, the paper leader travels downstream along the paper leader guide. Accordingly, the other paper web strip is threaded along a predetermined paper-threading path that passes the angle bar section.

Being threaded by the paper leader, the other paper web strip passes the angle bar section in such a manner as to change direction at the first bar (upstream side) and at the second bar.

Thus, the two paper leaders thread the corresponding paper web strips along the respective predetermined paper-threading paths, which extend to the folding unit.

Meanwhile, when an affixed end portion of the paper web strip that passes the angle bar section reaches a position located slightly downstream of the second bar of the angle bar section, the control/drive means operates.

Thereupon, the paper guide pivots from the standby position to the projection position, thereby pressing the paper web strip extending between the first bar and the second bar from one side toward the other side. In other words, the paper-threading path for the paper web strip detours around the paper guide such that the paper web strip extending between the first bar and the second bar comes into contact with the projected paper guide.

Thus is removed slack in the paper web strip extending between the first bar and the second bar, thereby tensioning the paper web strip between the first bar and the second bar.

When passing the first bar, the paper web strip tends to be drawn toward the paper leader guide while traveling toward the second bar. However, since the paper guide is inclined such that the amount of projection thereof increases toward the paper leader guide, a force is imposed on the paper web strip in such a manner as to draw the paper web strip away from the paper leader guide and toward the center of the width of the paper-threading path. While being subjected to such a force, the paper web strip travels toward and passes the second bar.

As described above, the tensioner provided in the angle bar section functions to remove slack in the paper web strip which passes the angle bar section during a paper-threading process, thereby preventing waving of the paper web strip which would otherwise result from slack and which would cause tearing of the paper web strip through imposition of a nonuniform tension on the paper web strip. Further, the tensioner prevents a sideways shift of the paper web strip toward the paper leader guide when the paper web strip travels from the first bar to the second bar, whereby the paper web strip is positioned properly while traveling.

Thus, the automatic paper-threading device of the present invention prevents paper web or the paper web strip from interfering with the paper leader guide or from being caught between the paper leader and a driving roller of the drive unit for driving the paper leader. Also, the device prevents imposition of a nonuniform tension on paper web or the paper web strip, thereby preventing tearing of paper web or the paper web strip and enabling smooth, reliable paper-threading operation in the angle bar section.

Because of its simple structure, the automatic paper-threading device hardly suffers malfunction and is easy to maintain.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

An embodiment of the present invention will next be describe in detail with reference to the drawings.

Figure 13:
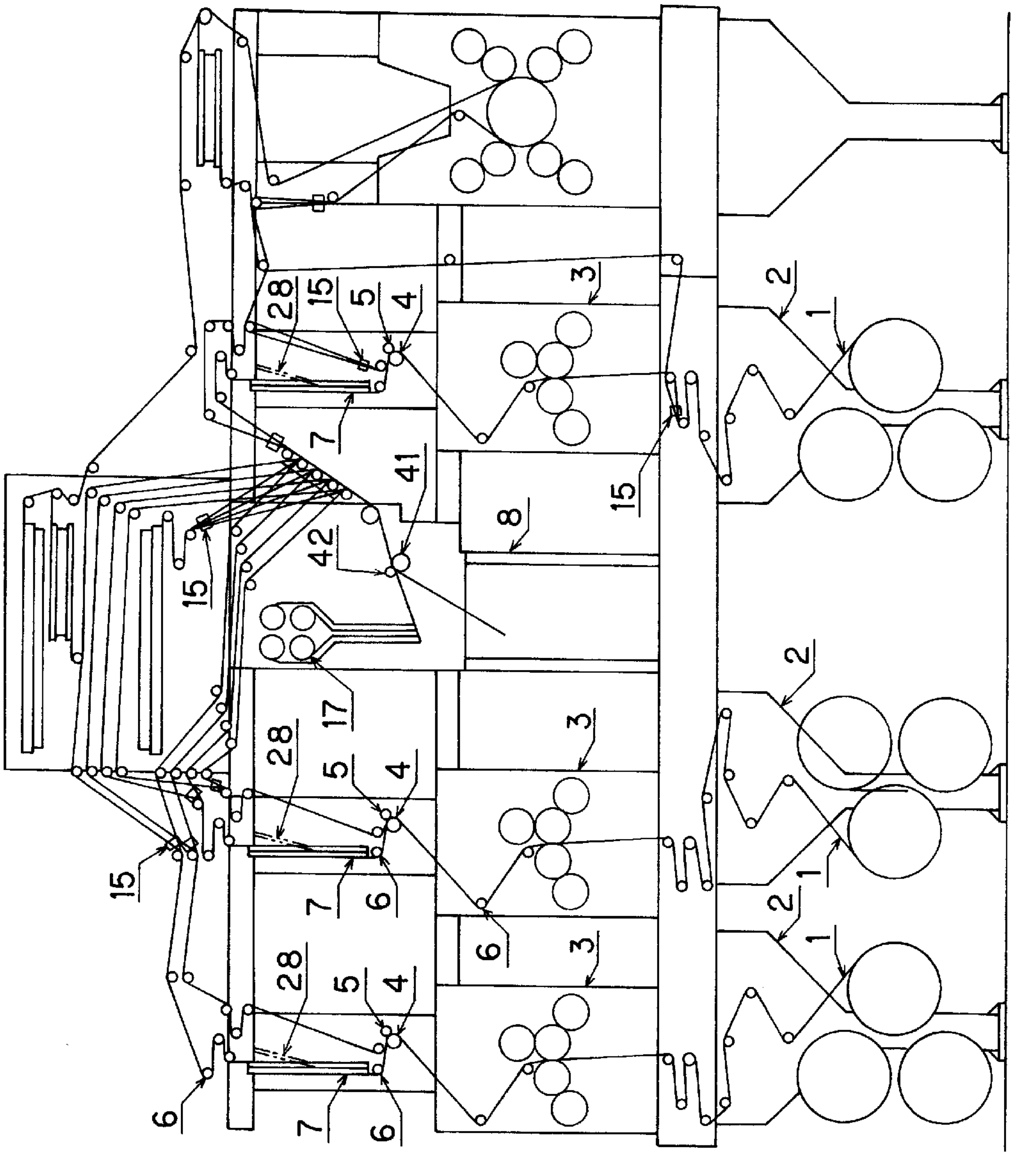
FIG. 13 is a schematic view of an offset rotary press according to the embodiment.

FIG. 13 shows a so-called B-B type offset rotary press, which employs an automatic paper-threading device for use in an angle bar section according to the embodiment.

As shown in FIG. 13, a plurality of paper web supply units 2 (three of them are shown in FIG. 13) are disposed in parallel on a floor. Three press units 3 corresponding to the paper web supply units 2 are disposed above the paper web supply units 2. A slitting unit and an angle bar section 7 are disposed above each press unit 3. The slitting unit includes a drag roller 4 and a slitter 5, provided above the corresponding press unit. In the slitting unit, paper web is longitudinally slit into two paper web strips, each having the same width. One of the two paper web strips passes the angle bar section 7.

A paper-threading path is formed between the paper web supply unit 2 and the press unit 3 and between the press unit 3 and the slitting unit, by means of guide rollers arranged in an appropriate manner. Also, a paper-threading path for each paper web strip is formed above each slitting unit by means of the angle bar section 7, the guide rollers 6 arranged in an appropriate manner, and a branch unit 15. These paper-threading paths are finally collected together and enter a folding unit 8 disposed between the press units, through a drag roller 41 and a paper-drawing roller 42, which are provided above the folding unit 8 and which face each other.

Figure 17:
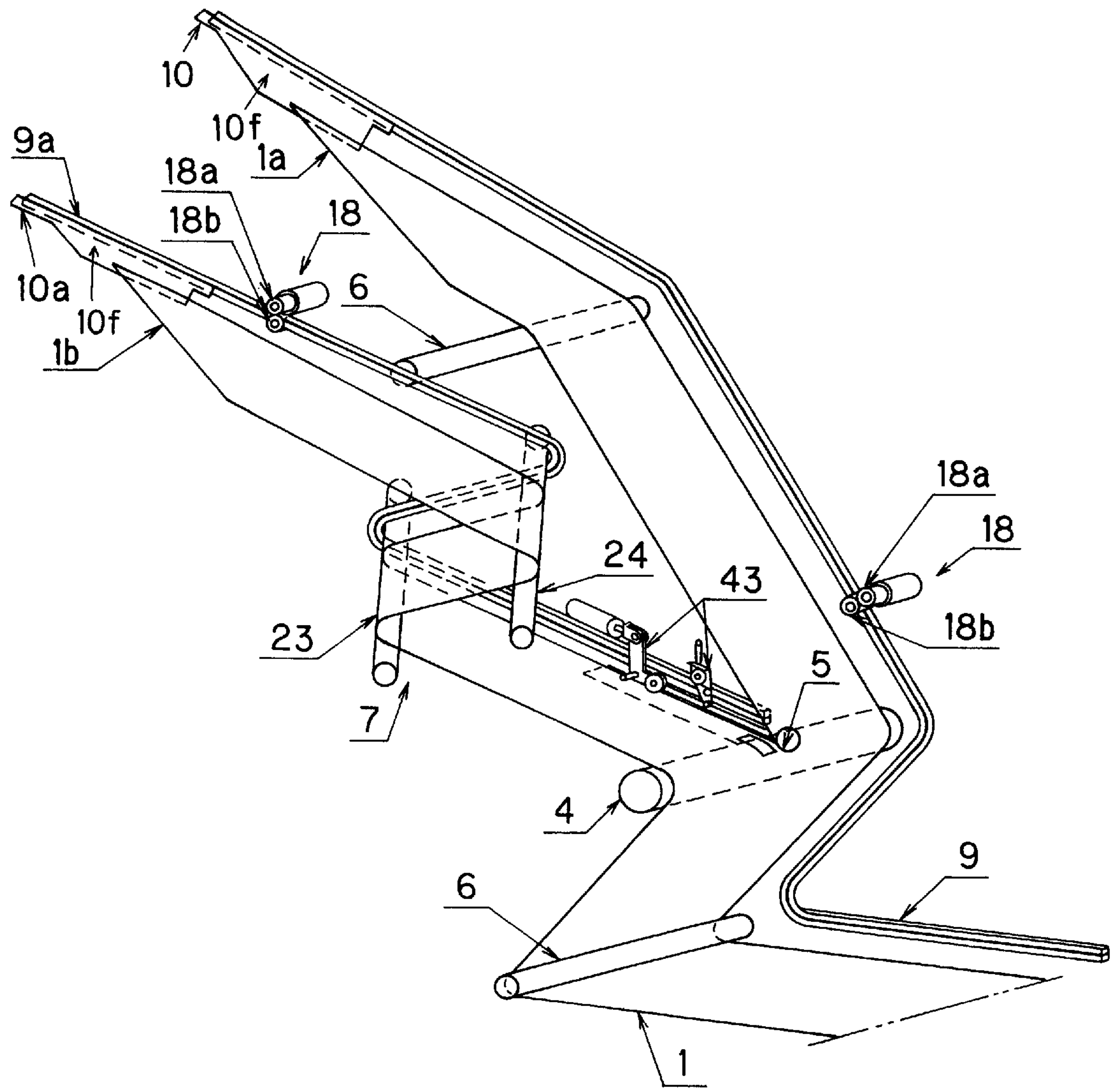
FIG. 17 is a schematic perspective view showing the structures of the angle bar section, slitting unit, and paper lead guide according to the embodiment.
Figure 18:
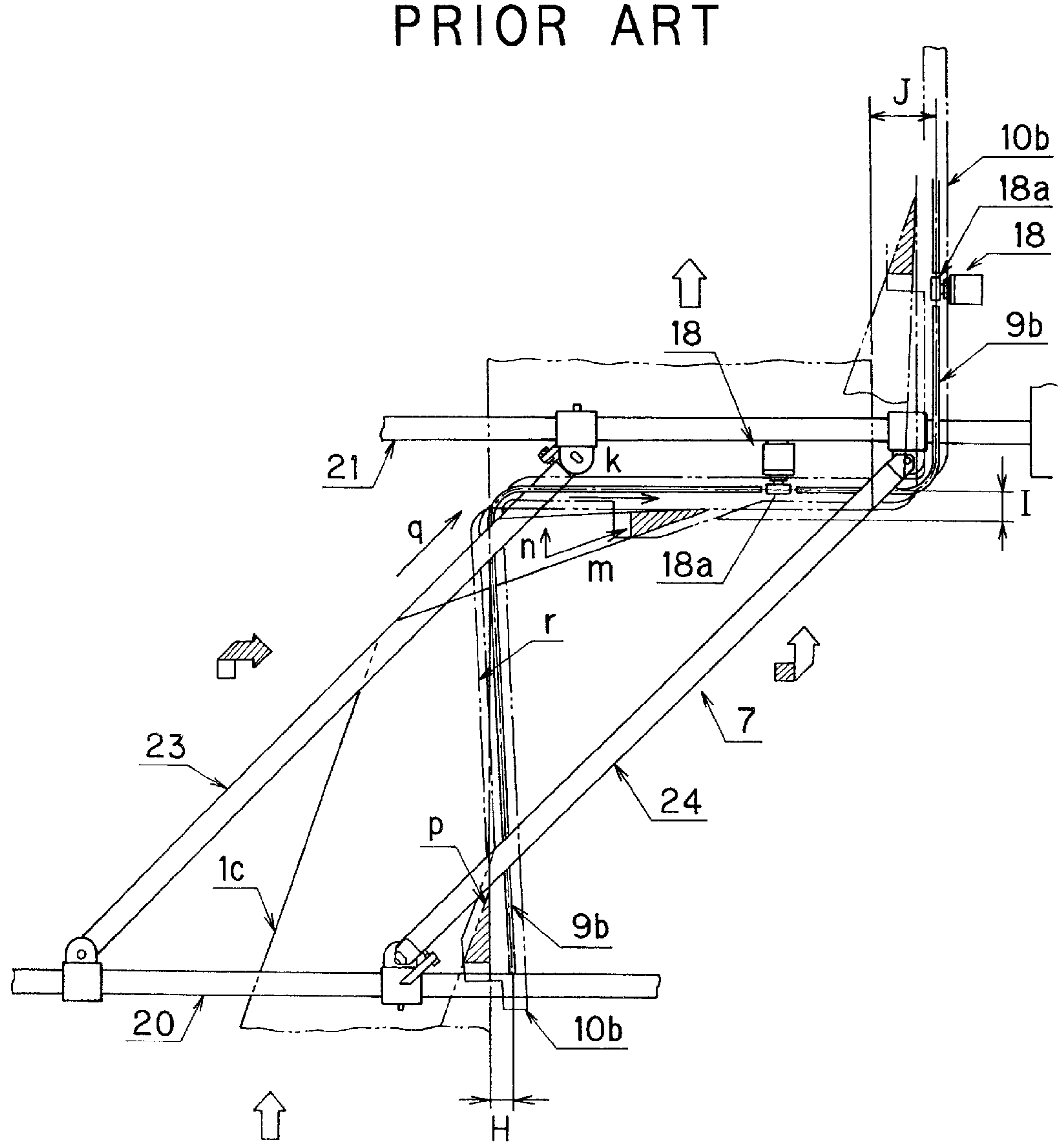
FIG. 18 PRIOR ART
FIG. 18 is a view of a conventional paper-threading device for use in an angle bar section, depicting the action of the device.

As shown in FIG. 17, paper leader guides 9 and 9*a* are disposed along the paper-threading path in order to allow strip-like paper leaders 10 and 10*a* to travel while being guided thereby.

A paper leader pool 17 is provided in the vicinity of the folding unit 8 in order to take up the paper leaders 10 and 10*a*, as needed, for storage purpose. At a position located immediately downstream of the opposed drag roller 41 and paper-drawing roller 42, the paper leader guides 9 and 9*a* branch off from the paper-threading paths that extend to the folding unit 8 for leading a first paper web strip 1*a* and a second paper web strip 1*b* thereto, and extend to the paper leader pool 17.

In FIG. 13, a satellite press unit (bearing no reference numeral) is disposed outside the press unit 3 located above the rightmost paper web supply unit 2. Paper web drawn from the rightmost paper web supply unit 2 travels through the branch unit 15 to thereby selectively travel to a paper-threading path extending to the press unit 3 or a paper-threading path extending to the satellite press unit. Description of the paper-threading path extending to the satellite press unit is omitted.

Figure 1:
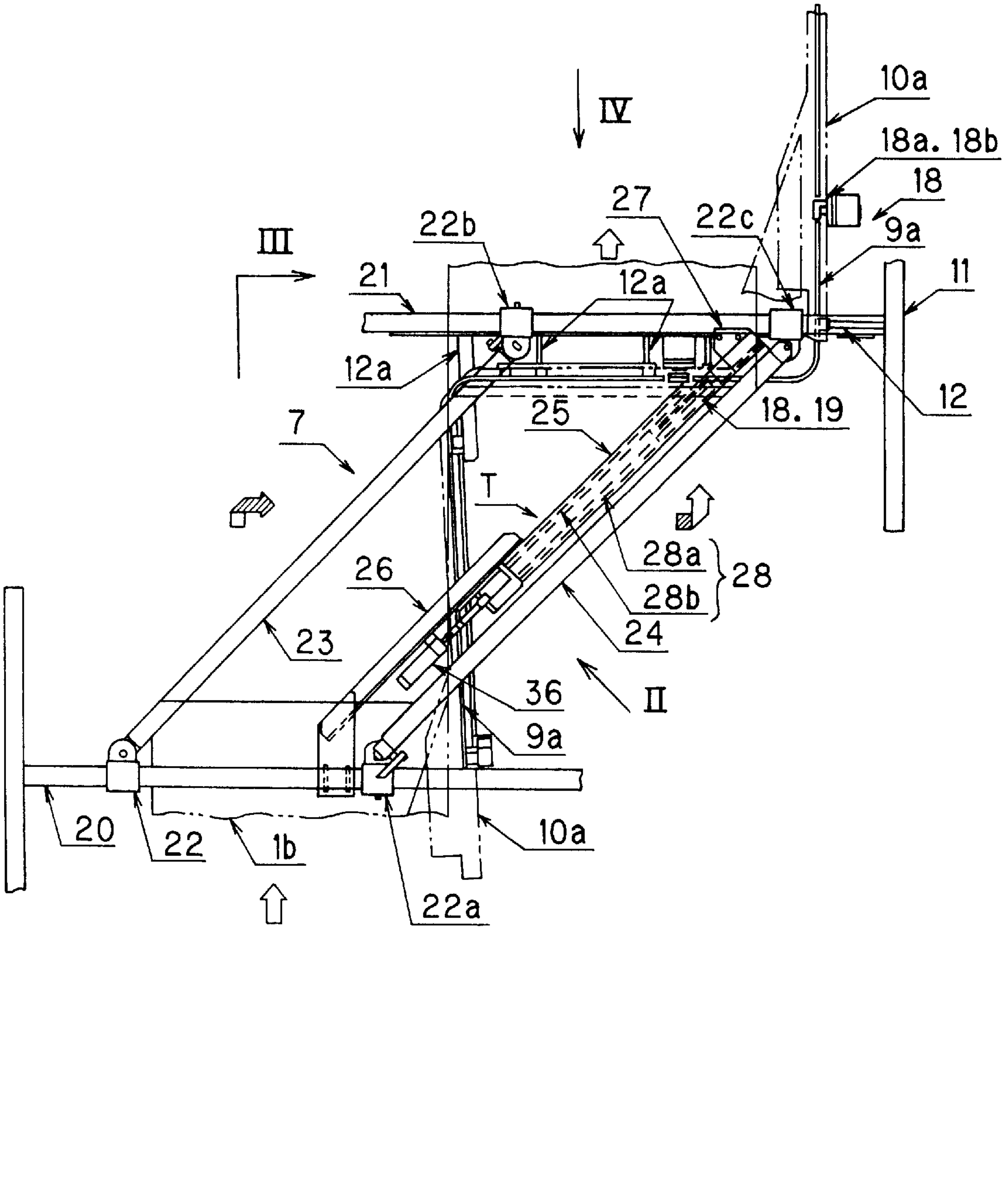
FIG. 1 is a general view of a paper-threading device for use in an angle bar section according to an embodiment of the present invention.

FIG. 1 shows the configuration of the angle bar section 7 disposed in the paper-threading path for the second paper web strip 1*b*, which is one of the two paper web strips resulting from slitting of paper web in the slitting unit.

The angle bar section 7 includes a first bar 23 and a second bar 24, which are disposed in parallel and separated by an appropriate distance and which extend between opposed frames 11 while being inclined with respect to the drag roller 4.

Specifically, support shafts 20 and 21 are arranged in parallel and separated by an appropriate distance and are fixedly attached at opposite ends to the frames 11. The support shafts 20 and 21 are oriented in parallel with the drag roller 4. The first bar 23 and the second bar 24 are attached at one end to the support shaft 20 by means of fixtures 22 and 22*a* and at the other end to the support shaft 21 by means of fixtures 22*b* and 22*c*.

The fixtures 22, 22*a*, 22*b*, and 22*c* are variably positioned in axial directions of the support shafts 20 and 21. Ends of the first and second bars 23 and 24 are attached to the fixtures 22, 22*a*, 22*b*, and 22*c*. The distance between and the inclination of the first bar 23 and the second bar 24 are adjustable.

On the support shaft 20, the fixture 22 is positioned substantially in a side edge region of the second paper web strip 1*b*, and the fixture 22*a* is positioned substantially in a central region thereof. On the support shaft 21, the fixture 22*c* is positioned substantially in a side edge region of the first paper web strip 1*a*, and the fixture 22*b* is positioned substantially in a central region thereof.

Accordingly, the second paper web strip 1*b* is looped around the first bar 23 to thereby twist its traveling direction according to the inclination of the first bar 23. The second paper web strip 1*b* further twists its traveling direction according to the inclination of the second bar 24 and opposite the directional twist effected by the first bar 23. As a result, the second paper web strip 1*b* travels while overlapping the first paper web strip 1*a*.

The paper leader guides 9 and 9*a* and the paper leaders 10 and 10*a*, which travel while being guided by the paper leader guides 9 and 9*a*, will next be described in detail.

As shown in FIG. 17, the paper leader guides 9 and 9*a* assumes the form of a rail and extend along the side edges of the paper web 1, the first and second paper web strips 1*a* and 1*b*, which travel along the corresponding paper-threading paths formed by means of guide rollers and other relevant members.

Figure 15:
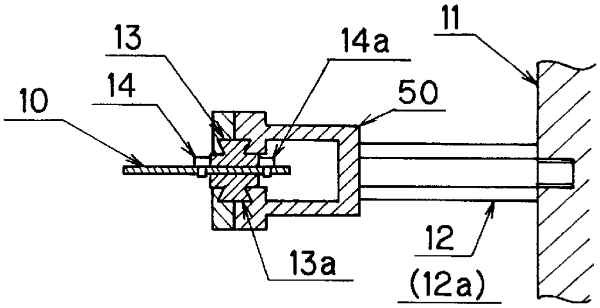
FIG. 15 is a sectional view of the paper leader and a paper leader guide, representing the relationship therebetween.

As shown in FIG. 15, the paper leader guide 9 (9*a*) includes guide members 13 and 13*a* and a guide body 50. The guide members 13 and 13*a* are two parallel strip members and are opposed each other. The guide body 50 is of an elongated material having a cross section shaped like a lying squarish letter U and includes both leg portions and a connection portion which connects the leg portions. The guide members 13 and 13*a* are attached to end portions of the legs.

The opposed surfaces of the guide members 13 and 13*a* hold therebetween the paper leader 10 (10*a*) assuming the form of a thin strip so as to serve as guide surfaces for the paper leader 10 (10*a*). The gap between the opposed surfaces is slightly greater than the thickness of the paper leader 10 (10*a*) to permit smooth travel of the paper leader 10 (10*a*).

In regions other than that of the angle bar section 7, the paper leader 9 (9*a*) is supported by brackets 12 (12*a*) projecting from the inner side of the frame 11. The brackets 12 (12*a*) are arranged at appropriate intervals along the paper-threading path. The connection portion of the guide body 50 is fixedly attached to the tip ends of the brackets 12 (12*a*). (See FIG. 15)

In the region between the slitting unit and the angle bar section 7, the brackets 12*a* for supporting the paper leader guide 9*a* for the second paper web strip 1*b* are projected appropriately longer than other brackets 12*a*.

In the region of the angle bar section 7, as shown in FIG. 1, the paper leader guide 9*a* is attached to the bracket 12*a*, which is in turn projectingly attached to the support shaft 21 located on the side of the cut side edge of the second paper web strip 1*b*.

Figure 14:
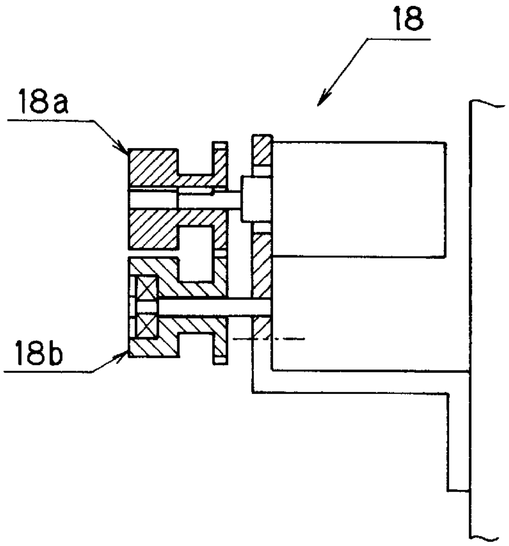
FIG. 14 is a sectional view of a drive unit for a paper leader according to the embodiment.

As shown in FIGS. 14 and 17, the guide member 13 (13*a*) has cuts formed therein and arranged at appropriate intervals. A drive unit 18 rests in each cut and is supported by a bracket fixedly attached to the inner side of the frame 11. The drive unit 18 includes a driving roller 18*a* and an auxiliary roller 18*b*. The driving roller 18*a* and the auxiliary roller 18*b* are rotatably mounted on the bracket in such a manner as to hold the paper leader 10 (10*a*) under an appropriate contact pressure.

As shown in FIG. 15, a pair of guide pins 14 and 14*a* are provided on the paper leader 10 (10*a*) and are arranged opposingly in the width direction of the paper leader 10 (10*a*) in such a manner as to hold the guide member 13 therebetween. Pairs of guide pins 14 and 14*a* are longitudinally disposed on the paper leader 10 (10*a*) at appropriate intervals. The paired guide pins restrict the position of the paper leader 10 (10*a*) in its width direction; i.e., the position of the paper web 1 and first paper web strip 1*a* affixed to the paper leader 10 and the position of the second paper web strip 1*b* affixed to the paper leader 10*a*.

As shown in FIG. 17, a rear end portion (with respect to the traveling direction of paper web) of the paper leader 10 (10*a*) extends inwardly in the widthwise direction of the paper web so as to form a paper web affixment portion 10*f*. When the paper web 1 is to be threaded along the paper-threading path, the side edge part of an obliquely cut end portion of paper web is affixed to the paper web affixment portion 10*f*.

Affixment of the leading end portion of the paper web 1 is performed at a standby position, which is a starting point of the paper-threading path, or by means of an affixing device 43. In the case of the second paper web strip 1*b*, which is one of the two paper web strips resulting from slitting of the paper web 1 in the slitting unit and which has a free end, the affixing action is performed by the affixing device 43 located immediately downstream of the slitting unit.

Figure 16:
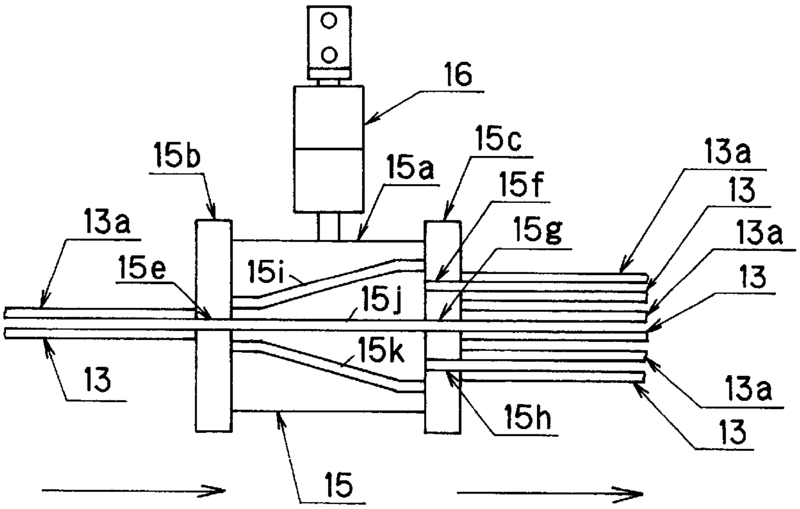
FIG. 16 is a sectional view of a branch unit, disposed in a paper-threading path, according to the embodiment.

A branch unit 15 as shown in FIG. 16 (showing the case of three branches) is provided on the paper leader guides 9 and 9*a* located at a branch point where the paper-threading path branches.

The branch unit 15 includes guide plates 15*b* and 15*c* and a branch member 15*a*. The guide plates 15*b* and 15*c* are disposed apart at an appropriate interval. An inner end surface of the guide plate 15*b* (15*c*) is aligned with the inner side surfaces of the guide members 13 and 13*a*. The guide plate 15*b* is attached to the end surfaces of the guide members 13 and 13*a* of the upstream paper leader guide 9 (9*a*), and the guide plate 15*c* is attached to the end surfaces of the guide members 13 and 13*a* of each of three (upper, middle, and lower in FIG. 16) paper leader guides 9 (9*a*). The branch member 15*a* is sandwiched between the guide plates 15*b* and 15*c*. The branch member 15*a* has the inner side surface which aligns with the inner end surfaces of the guide plates 15*b* and 15*c* and is movable in the arrangement direction of the three paper leader guides 9 (9*a*) (in the vertical direction in FIG. 16). The branch member 15*a* is positioned at any one of three positions (upper, middle, and lower positions in FIG. 16) by means of a fluid cylinder 16.

A groove 15*e* corresponding to the gap between the upstream guide members 13 and 13*a* is formed in the inner end surface of the guide plate 15*b* in such a manner as to be aligned with the gap. Grooves 15*f*, 15*g*, and 15*h* are formed in the inner end surface of the guide plate 15*c* in such a manner as to correspond to and be aligned with the gaps between the downstream, upper guide members 13 and 13*a*, between the downstream, middle guide members 13 and 13*a*, and between the downstream, lower guide members 13 and 13*a*, respectively. Grooves 15*i*, 15*j*, and 15*k* are formed in the inner side surface of the branch member 15*a* such that the groove 15*i* connects the groove 15*e* and the groove 15*f* when the branch member 15*a* is located at the lower position; the groove 15*j* connects the groove 15*e* and the groove 15*g* when the branch member 15*a* is located at the middle position; and the groove 15*k* connects the groove 15*e* and the groove 15*h* when the branch member 15*a* is located at the upper position.

A tensioner T provided in the angle bar section 7 will next be described.

As shown in FIGS. 1, 5, 6, and 7, the tensioner T includes a case 25 formed with an elongated material having a cross section shaped like a lying squarish letter U. One end of the case 25 is attached to the support shaft 20 by means of a bracket 26, while the other end of the case 25 is attached to the support shaft 21 by means of a bracket 27. The case 25 is located between and in parallel with the upstream first bar 23 and the downstream second bar 24 in such a manner as not to interfere with the paper-threading path. The opening of the cross section shaped like a lying squarish letter U faces the surface of the second paper web strip 1*b* extending between the first bar 23 and the second bar 24. In FIG. 1, the case 25 is located along and in parallel with the second bar 24 and opens toward the far side of the plane of the paper.

The base end of an arm 30 is pivotably attached to an end portion of the case 25 located on the side of the support shaft 21, by means of a pin 29 arranged in parallel with the plane of the paper of FIG. 1. Therefore, the arm 30 can pivot about the pin 29 with respect to the case 25.

A paper guide 28 is accommodated in the case 25 in a manner similar to that of the arm 30 and includes thin, tubular guide bars 28*a* and 28*b* arranged in parallel and separated by an appropriate distance. The base end of the paper guide 28 is located on the side of the support shaft 20 and is attached to a paper guide support 32 in such a manner as to be pivotable and longitudinally movable in the case 25. The opposite end of the paper guide 28 is pivotably pin-connected to the end of the arm 30.

As the paper guide support 32 moves toward the arm 30, the arm 30 and the paper guide 28 pivot in opposite directions. As a result, the tip end of the paper guide 28 is projected from the interior of the case 25, and thus the paper guide 28 is inclined. As the paper guide support 32 moves increasingly, the inclination increases.

As the paper guide support 32 moves away from the arm 30, the inclination of the paper guide 28 decreases, and thus the paper guide 28, together with the arm 30, is accommodated in the case 25.

In order for the paper guide 28 to be reliably projected, the paper guide 28 and the arm 30 accommodated in the case 25 are positioned off a dead point so as not to be arranged in a line.

As described above, the tensioner T is composed of the case 25, the arm 30, the paper guide 28, and the paper guide support 32. The structure of the tensioner T will be described in further detail.

Figure 5:
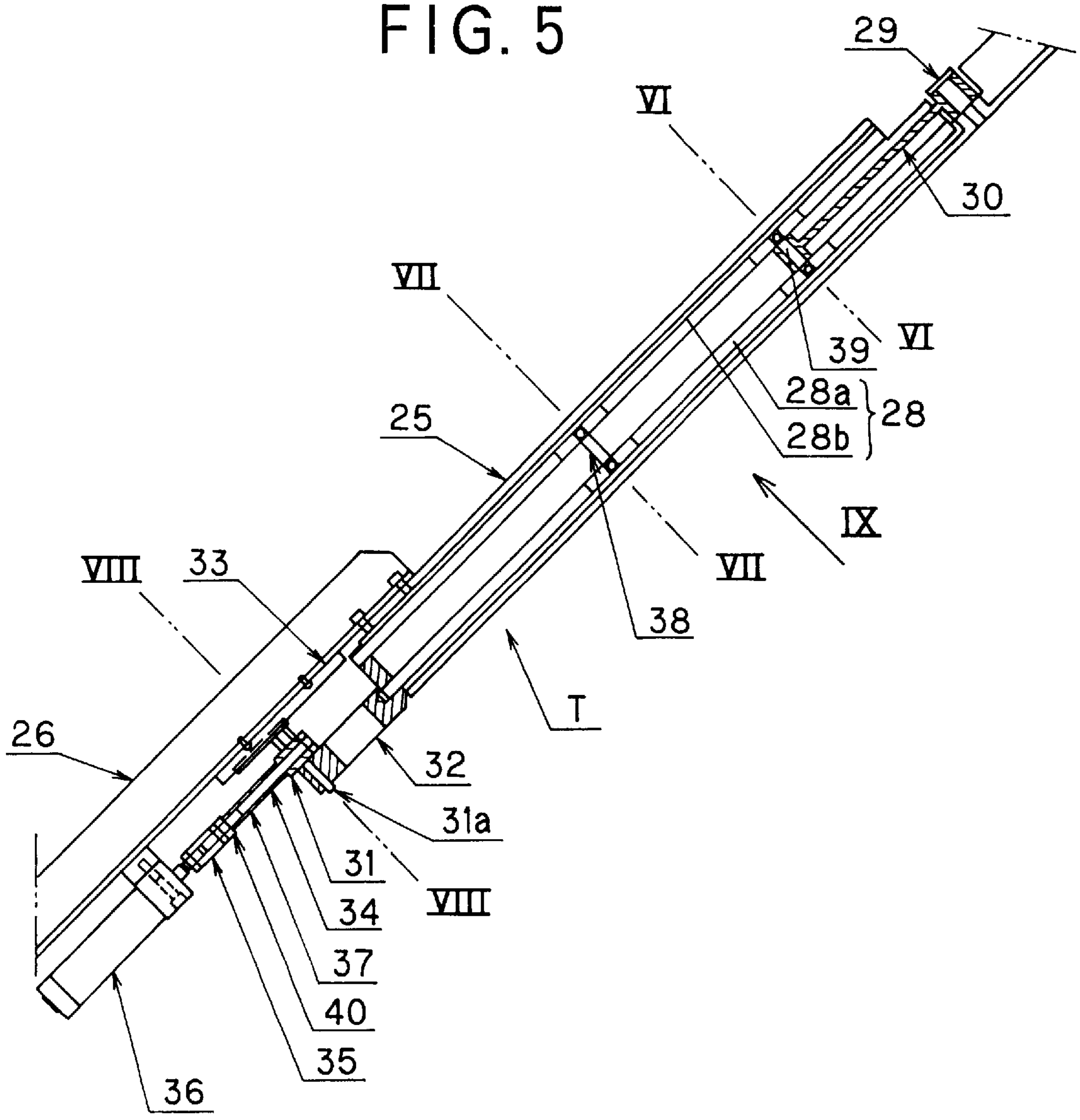
FIG. 5 is a partially sectional view of the tensioner as viewed in the direction of arrow V of FIG. 2 after the near-side portion of the case is eliminated.
Figure 6:
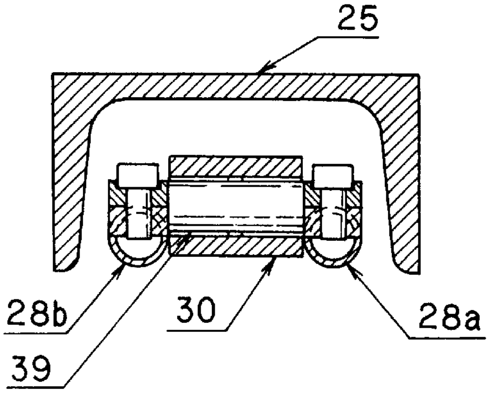
FIG. 6 is a sectional view taken along line VI—VI of FIG. 5.
Figure 7:
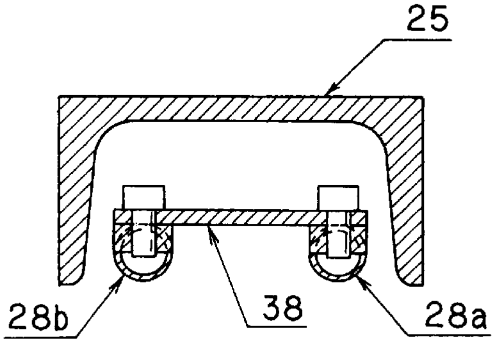
FIG. 7 is a sectional view taken along line VII—VII of FIG. 5.
Figure 8:
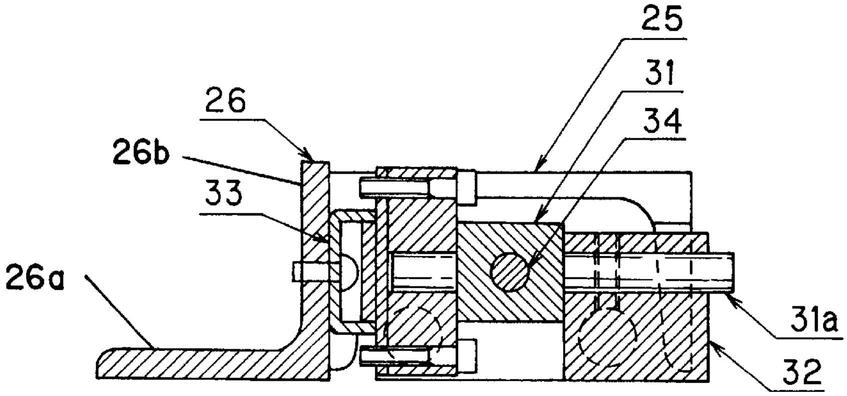
FIG. 8 is a sectional view taken along line VIII—VIII of FIG. 5.

As shown in FIGS. 1 and 5, a bracket 26 has a cross section shaped like the letter L. The base end of the bracket 26 is attached to the support shaft 20. The bracket 26 includes web 26*a* and a web 26*b*, which are respectively in parallel with and perpendicular to the second paper web 1*b* extending between the first bar 23 and the second bar 24. A fluid cylinder 36, a guide 33, and an end portion of a flange of the case 25, from the base end side of the bracket 26 to the other end side, are attached to the outside of the web 26*b* along the longitudinal direction of the bracket 26. The other end portion of the flange of the case 25 is attached to the bracket 27, which, in turn, is attached to the support shaft 21.

An affixed-end-portion sensor (not shown) is provided for detection of an end portion of the second paper web strip 1*b* affixed to the paper web affixment portion 10*f* of the paper leader 10*a*. The affixed-end-portion sensor outputs a detection signal when the affixed end portion reaches a position located slightly downstream of the second bar 24 of the angle bar section 7 after passing the second bar 24. The fluid cylinder 36 is actuated by means of a fluid circuit that is controlled on the basis of the detection signal.

A timer (not shown) is provided which is activated in response to the detection signal issued by the affixed-end-portion sensor. The fluid cylinder 36 is actuated in the reverse direction of the actuation effected by the affixed-end-portion detection signal, by means of a fluid circuit that is controlled on the basis of a signal issued from the timer and indicative of the elapse of a predetermined time.

The opposite end portions of the arm 30 are formed into bosses. A pin projecting from the flange of the case 25 is inserted into the boss on the base end side. (See FIG. 5) The two parallel guide bars 28*a* and 28*b* of the paper guide 28 are connected at their intermediate portions by means of a metallic reinforcement 38 to thereby reinforce the rigidity of the paper guide 28 (see FIG. 7). A pin-and-support 39 is inserted into the other boss of the arm 30, while the near-end portions of the guide bars 28*a* and 28*b* are attached to the corresponding opposite end portions of the pin-and-support 39 which are projected from the boss (see FIG. 6).

As shown in FIG. 5, the paper guide support 32 is projected from the end portion of the case 25 located on the side of the support shaft 20 and is positioned at a tip end portion of the bracket 26. The base end portions of the guide bars 28*a* and 28*b* are attached to the paper guide support 32.

A connection block 31 has a bolt hole formed therein and extending therethrough in the longitudinal direction of the case 25. A support pin 31*a* is projected laterally from the connection block 31. The connection block 31 is disposed in such a manner as to be movable in the longitudinal direction of the bracket 26; i.e., in the longitudinal direction of the case 25 while being guided by a guide 33. The paper guide support 32 is rotatably attached to the support pin 31*a.*

A bolt 34 is screwed into the bolt hole formed in the connection block 31 and extends toward the fluid cylinder 36. A nut 40 is screwed onto the threaded portion of the bolt 34. A compression coil spring 37 is fitted to the bolt 34 and is located between the connection block 31 and the nut 40, while a pre-load is imposed thereon. An end portion of the bolt 34 and a threaded end portion of a piston rod of the fluid cylinder 36 are connected by means of a threaded sleeve coupling 35.

In preparation for threading paper web into a rotary press before start of printing, the following preparatory work is carried out. First, a paper-threading path is selected at the branch units 15, which are appropriately disposed in paper-threading paths extending from the paper web supply units 2 to the folding unit 8.

The selection of a paper-threading path at the branch unit 15 is performed in the following manner. In the case of the branch unit 15 of FIG. 16, the fluid cylinder 16 is actuated to thereby move the branch member 15*a* in the vertical direction for selection of a desired paper-threading path.

When the branch member 15*a* is located at the lower position of its stroke, the groove 15*e* and the groove 15*f* communicate with each other through the groove 15*i*. The upstream paper leader guide 9 (9*a*) is connected to the downstream upper paper leader guide 9 (9*a*) through the branch unit 15.

When the branch member 15*a* is located at the middle position of its stroke, the groove 15*e* and the groove 15*g* communicate with each other through the groove 15*j*. The upstream paper leader guide 9 (9*a*) is connected to the downstream middle paper leader guide 9 (9*a*) through the branch unit 15.

When the branch member 15*a* is located at the upper position of its stroke, the groove 15*e* and the groove 15*h* communicate with each other through the groove 15*k*. The upstream paper leader guide 9 (9*a*) is connected to the downstream lower paper leader guide 9 (9*a*) through the branch unit 15.

The paper leaders 10 (10*a*) taken up in the paper leader pool 17 are drawn out from the paper leader pool 17 while being headed by the respective paper web affixment portions 10*f*, and are inserted into the corresponding paper leader guides 9 (9*a*). Being held between the driving roller 18*a* and the auxiliary roller 18*b*, which are rotating in reverse, of each drive unit 18, the paper leaders 10 (10*a*) are caused to travel in the reverse direction of the case where they are threaded along the respectively selected paper-threading paths, until the paper web affixment portions 10*f* travel from the position of the opposed drag roller 41 and paper-drawing roller 42 to the corresponding standby positions or affixing devices 43 in the paper web supply units 2 or slitting units (each including the drag roller 4 and the slitter 5). Thus, the paper web affixment portions 10*f* stand by at the respective standby positions.

An obliquely cut leading end portion of the paper web 1 which is drawn out from the paper web supply unit 2 is affixed to the paper web affixment portion 10*f* of the paper leader 10 manually or automatically by use of an appropriate automatic device at the standby position, which serves as a starting point of a paper-threading path, in the paper web supply unit 2.

Upon completion of the above-described preparation for a paper-threading operation, paper feeders, such as the drag rollers 4, are operated at a predetermined speed. Also, the driving rollers 18*a* of the drive units 18 disposed at appropriate positions along the corresponding paper-threading path formed by the paper leader guide 9 are rotated at a predetermined speed in the regular direction. Accordingly, the paper leader 10 held between the driving rollers 18*a* and the auxiliary rollers 18*b* travels downstream along the paper leader guide 9 at a speed synchronous with that of the paper web 1 which is caused to travel forward by the paper feeders. The paper web 1 is thus threaded along a predetermined paper-threading path extending along the guide rollers 6 and through the press unit 3 and the slitting unit (including the drag roller 4 and the slitter 5).

Passing between the drag roller 4 and the slitter 5, which are rotated in an opposed manner, the paper web 1 is slit longitudinally at the center of the width thereof, thereby being divided into the first paper web strip 1*a* and the paper web strip 1*b*. (See FIG. 17)

The first paper web strip 1*a* remains affixed to the paper web affixment portion 10*f* of the paper leader 10, which keeps traveling along the paper leader guide 9; thus, the paper web strip 1*a* keeps traveling along the predetermined paper-threading path.

An obliquely cut end portion of the other paper web strip 1*b* is automatically affixed to the paper web affixment portion 10*f* of the paper leader 10*a* which stands by at the affixing device 43 located immediately downstream of the center of the slitting unit.

A paper leader guide 9*a* for the standby paper leader 10*a* has its starting point located immediately downstream of the center of the slitting unit and is equipped with the drive units 18 disposed at appropriate positions. The driving rollers 18*a* of these drive units 18 are rotated at a predetermined speed in the regular direction.

The paper leader 10*a* held between the driving rollers 18*a* and the auxiliary rollers 18*b* travels downstream along the paper leader guide 9*a* at a speed synchronous with that of the paper web 1 which is caused to travel forward by the paper feeders. Accordingly, the second paper web strip 1*b* is threaded along a predetermined paper-threading path defined by the guide rollers 6 and the angle bar section 7.

When the paper leader 10 (10*a*) travels while being guided by the paper leader guide 9 (9*a*), the guide pins 14 and 14*a* of the paper leader 10 (10*a*) hold the guide member 13 therebetween in the width direction of the guide member 13. Thus, the paper leaders 10 and 10*a* are free from positional deviation in their width direction; i.e., the paper web 1 and first paper web strip 1*a* affixed to the paper leader 10 and the second paper web strip 1*b* affixed to the paper leader 10*a* are free from positional deviation in their width direction.

In the angle bar section 7, the second paper web strip 1*b* threaded by the paper leader 10*a* is looped around the upstream first bar 23 (in FIG. 1, from the far side of the plane of the paper toward the near side of the plane) to thereby make a right-angled turn with respect to its traveling direction. Then, the second paper web strip 1*b* is looped around the downstream second bar 24 (in FIG. 1, from the far side of the plane of the paper toward the near side of the plane) to thereby make a right-angled turn with respect to its traveling direction.

As a result, the second paper web 1*b* travels on the paper-threading path that aligns in the centerline with the first paper web strip 1*a*, which does not travel through the angle bar section 7. That is, the second paper web strip 1*b* travels while overlapping the first paper web strip 1*a*.

The thus-overlapping, paired first paper web strip 1*a* and second paper web strip 1*b* extending from each press unit 3 are threaded along a predetermined paper-threading path defined by the guide rollers 6. Being further superposed on one another, these paired paper web strips travel through the gap between the drag roller 41 and the paper-drawing roller 42 and then reach the folding unit 8.

At a position located immediately downstream of the opposed drag roller 41 and paper-drawing roller 42, the paper leader guides 9 and 9*a* branch off from the paper-threading paths that extend to the folding unit 8 for threading the paper web strips thereto, and extend to the paper leader pool 17. Thus, the paper web affixment portion 10*f* of the paper leader 10 (10*a*) is separated from the orthogonally cut end portion of the first paper web strip 1*a* (second paper web strip 1*b*). The paper leaders 10 and 10*a* are taken up by the paper leader pool 17.

As described above, through insertion of the paper leader 10 (10*a*) into a selected paper leader guide 9 (9*a*), the first paper web strip 1*a* (second paper web strip 1*b*) is threaded along selected, predetermined paper-threading paths that extend to the folding unit 8.

In the above-described paper-threading action, the fluid circuit of the fluid cylinder 36 is controlled on the basis of a detection signal issued by the affixed-end-portion sensor (not shown), thereby actuating the fluid cylinder 36. The affixed-end-portion sensor outputs the detection signal when the affixed end portion of the second paper web strip 1*b* reaches a position located slightly downstream of the second bar 24 of the angle bar section 7 after passing the second bar 24. In response to the detection signal, the fluid cylinder 36 is operated.

Thus, the piston rod of the fluid cylinder 36 stretches by stroke S. As a result, the connection block 31 moves linearly from position c to position d in the direction of arrow e while being guided by the guide 33 via the threaded sleeve coupling 35, the nut 40, and the compression coil spring 37; i.e., the connection block 31 advances.

Figure 9:
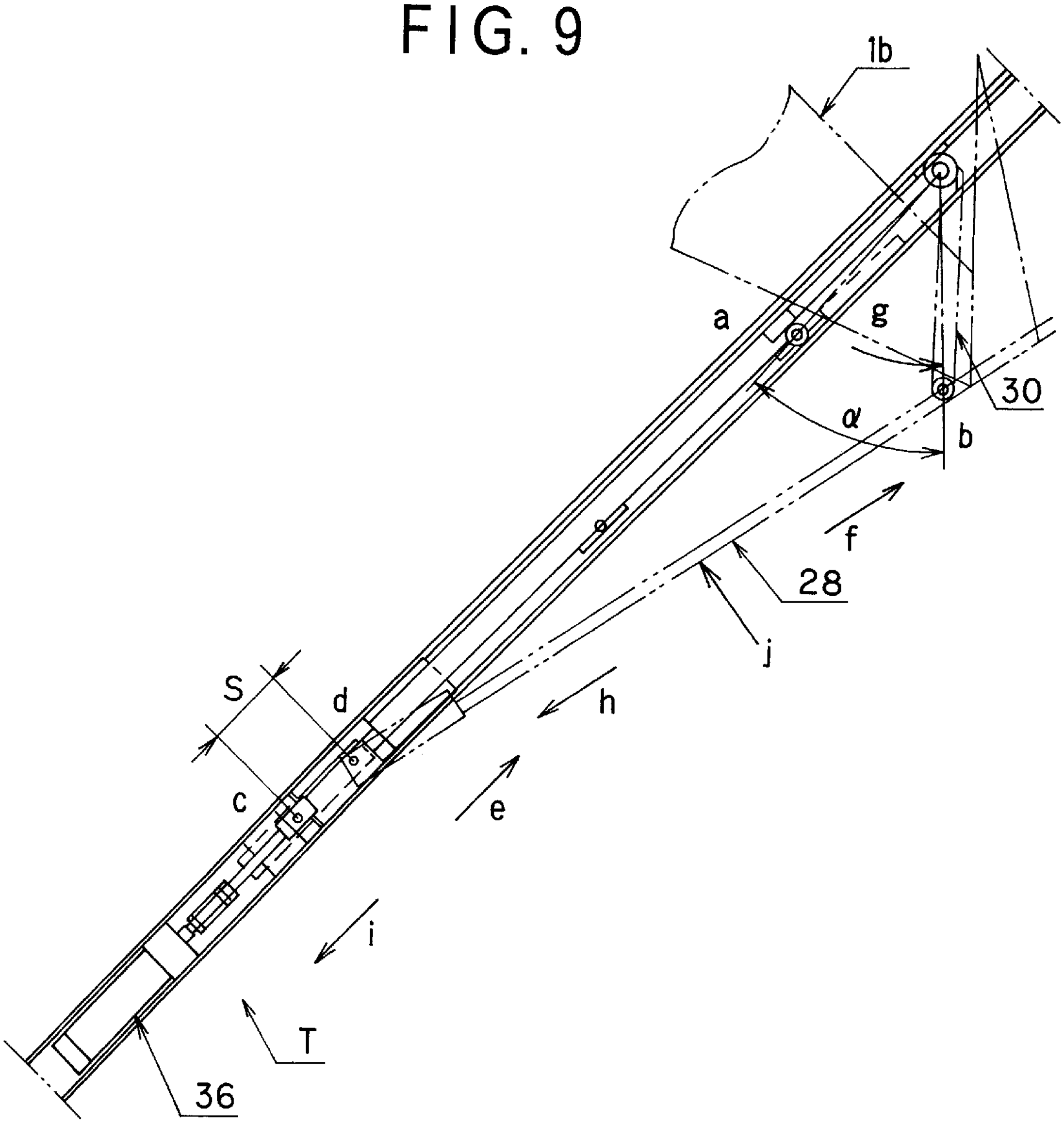
FIG. 9 is a view of the tensioner as viewed in the direction of arrow IX of FIG. 5 after a near-side portion of a case is eliminated.

As a result of advancement of the connection block 31; i.e., advancement of the support pin 31*a* which is a substantial, pivotal center of the paper guide 28, the paper guide 28 pivots on the support pin 31*a* clockwise in FIG. 9 and thus increases its inclination. Since a portion of the paper guide 28 near its tip end is pivotably pin-connected to the end of the arm 30, the end of the paper guide 28 advances in the direction of arrow f and projects from the opening of the case 25 while causing the arm 30 to pivot on the pin 29 counterclockwise; specifically, by angle α in the direction of arrow g.

In the initial state where the paper guide 28 and the arm 30 are accommodated in the case 25, the paper guide 28 and the arm 30 are not arranged in a line, but are arranged in a bent line; i.e., such that the pin-connected portion thereof is slightly projected toward the opening of the case 25. In other words, the paper guide 28 and the arm 30 are positioned off a dead point, so that the above-described pivoting action can be smoothly initiated.

Figure 10:
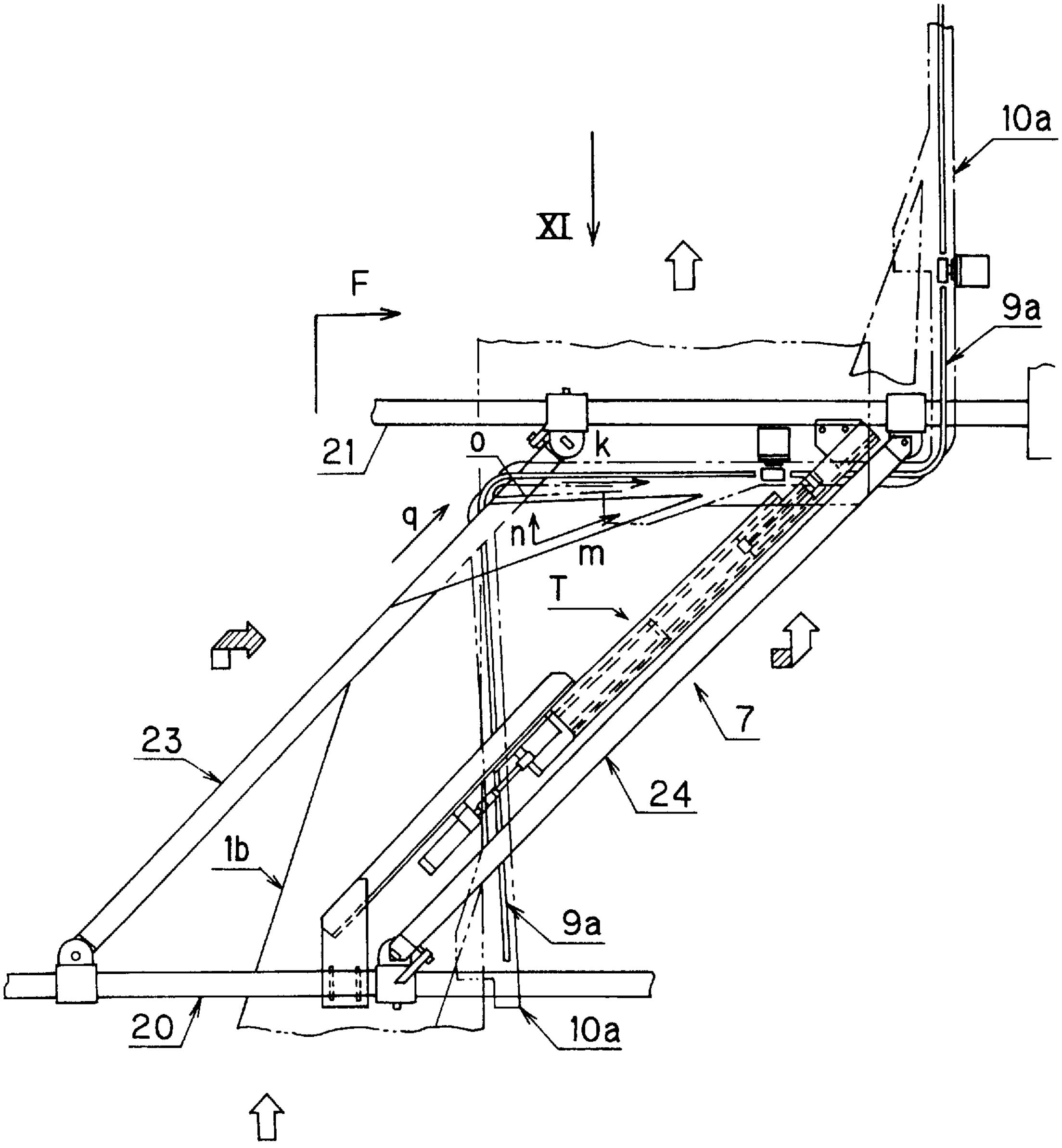
FIG. 10 is a view of the paper-threading device according to the embodiment, depicting the action of the device.

In FIGS. 1 and 10, the second paper web 1*b* extends between the first bar 23 and the second bar 24 such that the second paper web 1*b* is looped around the first bar 23 from the near side of the plane of the paper and is looped around the second bar 24 from the far side of the plane of the paper. The paper guide 28 projected as described above presses the second paper web 1*b* from the near side of the plane of the paper toward the far side of the plane of the paper in the vicinity of the second bar 24. In other words, the paper-threading path for the second paper web strip 1*b* detours around the paper guide 28 such that the second paper web strip 1*b* extending between the first bar 28 and the second bar 24 comes into contact with the projected paper guide from the far side of the plane of the paper.

Thus is removed slack in the second paper web strip 1*b* extending between the first bar 23 and the second bar 24, thereby tensioning the second paper web strip 1*b* between the first bar 23 and the second bar 24.

When passing the first bar 23, the second paper web strip 1*b*—a side edge portion of which is affixed to the paper leader 10*a* guided by the paper leader guide 9*a*—tends to be drawn toward the paper leader guide 9*a* while traveling toward the second bar. However, since the paper guide 28 is inclined such that the amount of projection thereof increases toward the paper leader guide 9*a*, a force is imposed on the second paper web strip 1*b* in such a manner as to draw the second paper web strip 1*b* away from the paper leader guide 9*a* and toward the center of the width of the paper-threading path. While being subjected to such a force, the second paper web strip 1*b* travels toward and passes the second bar 24.

Figure 11:
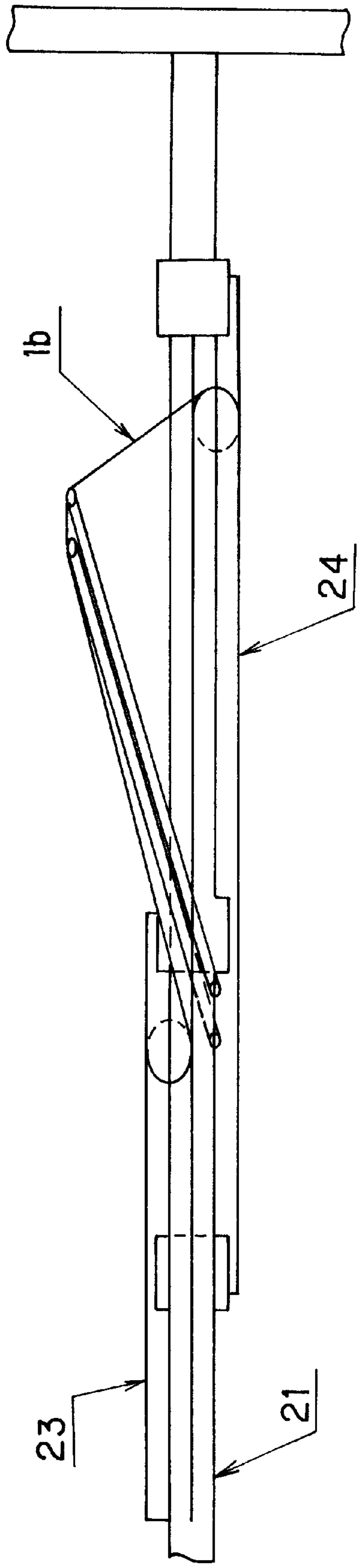
FIG. 11 is a view of the tensioner as viewed in the direction of arrow XI of FIG. 10.

The above-mentioned web-position adjustment mechanism will be further described in detail with reference to FIGS. 10, 11, and 12.

In FIG. 10, when the second paper web strip 1*b* travels from the first bar 23 to the second bar 24, a force acts on the second paper web strip 1*b* in the direction of arrow m, since a force of pulling the paper leader 10*a*, or a force directed in the direction of arrow k, is produced at the center of the paper leader guide 9*a*.

A component force directed in the direction of arrow n of the above-mentioned force directed in the direction of arrow m causes the second paper web strip 1*b* to move in the direction of arrow n while traveling in the traveling direction of the paper leader 10*a* (in the direction of arrow k).

In an initial stage of a paper-threading process, the contact area between the second paper web strip 1*b* and the first bar 23 is smaller than that in a later stage, and the second paper web strip 1*b* is slack. Thus, a frictional resistance generated between the second paper web strip 1*b* and the first bar 23 is low, so that the second paper web strip 1*b* easily shifts on the first bar 23 in the direction of arrow q.

When the fluid cylinder 36 is operated in response to a detection signal issued from the affixed-end-portion sensor (not shown) as described previously, the paper guide 28 pivots such that an end portion located on the side of the paper leader guide 9*a* is displaced greater than is a portion located in a central region of the paper-threading path. Thus, the paper guide 28 projects perpendicularly to the plane of the paper of FIG. 10 (in the direction directed from the near side of the plane of the paper toward the far side of the plane), thereby eliminating slack from the second paper web strip 1*b* and thus preventing waving of the second paper web strip 1*b*. Waving of the second paper web strip 1*b* causes imposition of a nonuniform tension on the second paper web strip 1*b*, potentially causing tearing of the second paper web strip 1*b*.

Figure 12:
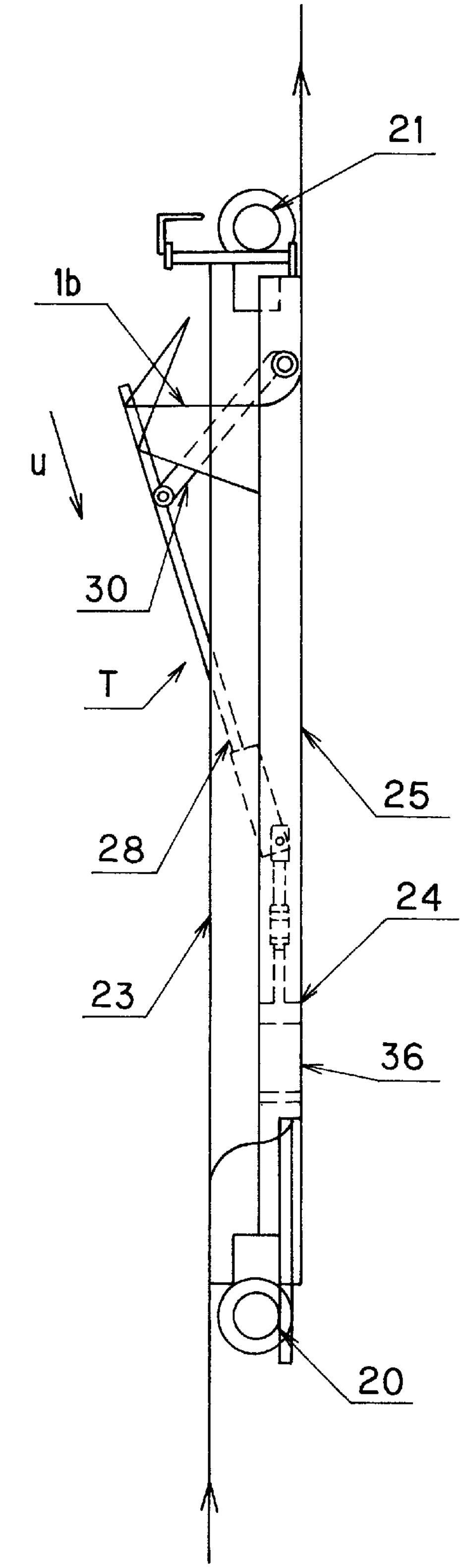
FIG. 12 is a view of the tensioner according to the embodiment, depicting the action of the tensioner.

As shown in FIG. 12, the contact area between the second paper web strip 1*b*, which detours around the paper guide 28, and guide bars 28*a* and 28*b* of the paper guide 28 is small, and thus the frictional resistance therebetween is low. Therefore, the second paper web 1*b* travels while easily shifting in the direction of arrow u along the inclination of the paper guide 28, thereby canceling a bias of the second paper web strip 1*b* which has been effected toward the paper leader guide 9*a* when the second paper web strip 1*b* has passed the first bar 23.

Figure 2:
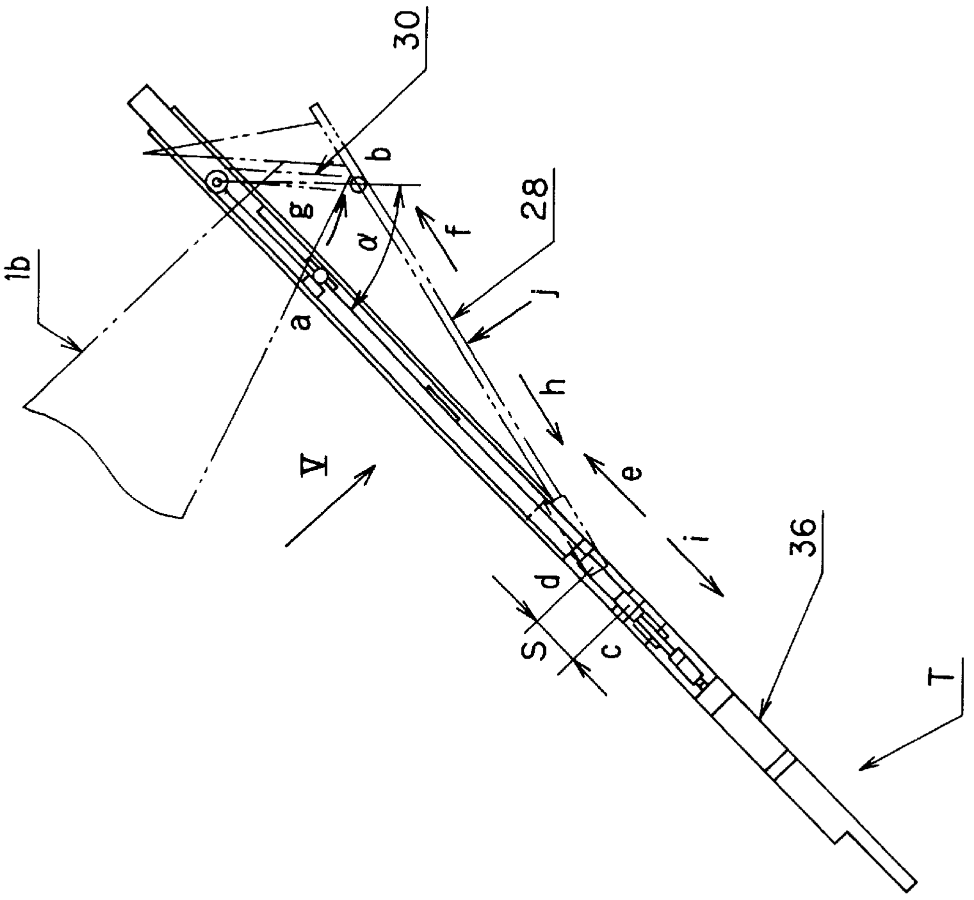
FIG. 2 is a view of a tensioner of an angle bar section as viewed In the direction of arrow II of FIG. 1 after a near-side portion of a case is eliminated.
Figure 3:
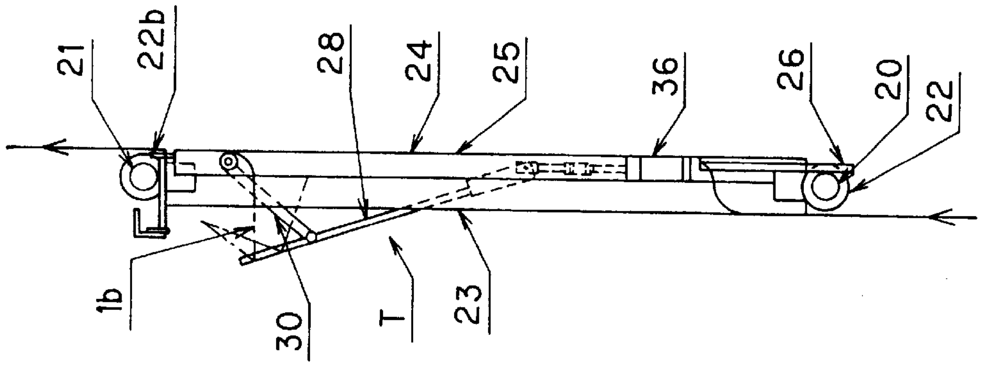
FIG. 3 is a view of the tensioner as viewed in the direction of arrow III of FIG. 1.
Figure 4:
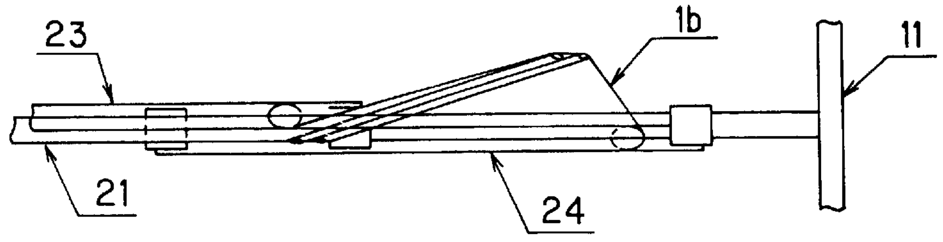
FIG. 4 is a view of the tensioner as viewed in the direction of arrow IV of FIG. 1.

In the case where a relatively large tension is applied to the second paper web strip 1*b* to thereby cause a force to be imposed on the paper guide 28 in the direction of arrow j of FIG. 2, a thrust is imposed on the paper guide 28 in the direction of arrow h. This thrust causes the connection block 31 to move in the direction of arrow i against a spring force of the compression coil spring 37, thereby preventing tearing of the second paper web strip 1*b*. Through adjustment of the distance between an end face of the connection block 31 and the corresponding end face of the nut 40 by turning the nut 40, the spring force of the compression coil spring 37 can be adjusted, thereby coping with various kinds of the second paper web strips 1*b* of different strength.

Even after the piston rod of the fluid cylinder 36 is stretched, the paper leader 10*a* keeps leading the second paper web strip 1*b*. The paper web affixment portion 10*f* of the paper leader 10*a*; i.e., the obliquely cut end portion of the second paper web strip 1*b* travels downstream along the paper leader guide 9*a*. When the obliquely cut end portion leaves the second bar 24 of the angle bar section 7, the side edges of the subsequent portion of the second paper web strip 1*b* become substantially parallel to the paper leader guide 9*a* in the vicinity of and downstream of the second bar 24.

Also, the width of a portion of the second paper web strip 1*b* looped around the first bar 23 becomes sufficiently wide to produce a contact friction force with the first bar 23 and the second bar 24.

There is provided a timer that measures a predetermined time interval between output of a detection signal from the affixed-end-portion sensor and the establishment of the above-described state where the side edges of the second paper web strip 1*b* become substantially parallel to the paper leader guide 9*a* in the vicinity of and downstream of the second bar 24 and the width of a portion of the second paper web strip 1*b* looped around the first bar 23 becomes sufficiently wide. When the timer signals the end of the time interval, the fluid circuit of the fluid cylinder 36 is controlled such that the fluid cylinder 36 operates in the reverse direction of the previously-described case where the affixed-end-portion detection sensor issues a detection signal.

Thus, the piston rod of the fluid cylinder 36 retracts; consequently, the connection block 31 retreats to its standby position while being guided by the guide 33 via the threaded sleeve coupling 35 and the bolt 34. As a result, the paper guide 28 is accommodated in the case 25 and comes out of contact with the second paper web strip 1*b*.

As described above, being threaded by the paper leader 10*a*, the second paper web strip 1*b* is threaded through the angle bar section 7 and then reaches the folding unit 8, where the second paper web strip 1*b* is held between the drag roller 41 and the paper-drawing roller 42. The paper-threading process is thus completed.

The tensioner employed in the present invention and provided in the angle bar section 7 functions to remove slack in the second paper web strip 1*b* which passes the angle bar section 7 during a paper-threading process, thereby preventing waving of the second paper web strip 1*b* which would otherwise result from slack and which would cause tearing of the second paper web strip 1*b* through imposition of a nonuniform tension on the second paper web strip 1*b*.

Further, the tensioner prevents a sideways shift of the second paper web strip 1*b* toward the paper leader guide 9*a* when the second paper web strip 1*b* travels from the first bar 23 to the second bard 24, whereby the second paper web strip 1*b* is positioned properly while traveling.

In the above embodiment, the angle bar section 7 of the rotary press is disposed in the paper-threading path for the second paper web strip 1*b*, which is one of the two paper web strips resulting from slitting of the paper web 1 in the slitting unit (including the drag roller 4 and the slitter 5) located downstream of the press unit 3 and which is affixed to a new paper leader 10*a*. However, the angle bar section 7 may be disposed in the paper-threading path for the printed paper web 1 coming directly from the press unit 3.

Obviously, numerous modifications and variations of the present invention are possible in light of the above teachings. It is therefore to be understood that within the scope of the appended claims, the present invention may be practiced otherwise than as specifically described herein.

What is claimed is:

1. An automatic paper-threading device for use in an angle bar section of a rotary press including a paper web supply unit, a press unit, an angle bar section, and a folding unit and having a paper-threading path for paper web formed therein, the angle bar section being disposed in the paper-threading path and comprising a first bar and a second bar disposed in parallel and separated by an appropriate distance, the paper-threading device comprising:

- a paper leader guide comprising a drive unit for moving along the paper-threading path a paper leader affixed to a leading end portion of paper web; and
- a tensioner provided in the angle bar section, the tensioner comprising a paper guide which is disposed between the first bar and the second bar to extend in the width direction of the paper web, the paper guide being moved between a standby position where the paper guide does not interfere with the paper-threading path and a projection position where the paper guide projects across the paper-threading path to thereby urge the paper web outward.

2. An automatic paper-threading device for use in an angle bar section according to claim 1, wherein the paper guide of the tensioner is a bar-like member extending in the width direction of paper web and capable of pivoting between the standby position where the bar-like member does not interfere with the paper-threading path and the projection position where an end portion of the bar-like member located on the side of the paper leader guide projects across the paper-threading path.

3. An automatic paper-threading device for use in an angle bar section according to claim 2, wherein the tensioner further comprises control/drive means for causing the paper guide to project at an appropriate timing after a leading end of paper web has passed the second bar located downstream of the first bar in the angle bar section.

4. An automatic paper-threading device for use in an angle bar section according to claim 1, wherein the tensioner further comprises control/drive means for causing the paper guide to project at an appropriate timing after a leading end of paper web has passed the second bar located downstream of the first bar in the angle bar section.

5. An automatic paper-threading device for use in an angle bar section of a rotary press which comprises a paper web supply unit, a press unit, a slitting unit, an angle bar section, and a folding unit, and in which a first paper-threading path for paper web is formed between the paper web supply unit and the slitting unit via the press unit, second and third paper-threading paths for first and second paper web strips coming from the slitting unit are formed between the slitting unit and the folding unit, and the angle bar section is disposed in the third paper-threading path for the second paper web strip and comprises a first bar and a second bar disposed in parallel with an appropriate separation therebetween and inclined with respect to a paper-threading direction, the paper-threading device comprising:

a first paper leader guide comprising a drive unit for moving along the second paper-threading path a first paper leader affixed to a leading end portion of the first paper web strip;

a second paper leader guide comprising a drive unit for moving along the third paper-threading path a second paper leader affixed to a leading end portion of the second paper web strip; and a tensioner provided in the angle bar section, the tensioner comprising a paper guide which is disposed between the first bar and the second bar to extend in the width direction of the second paper web strip, the paper guide being moved between a standby position where the paper guide does not interfere with the third paper-threading path and a projection position where the paper guide projects across the third paper-threading path to thereby urge the second paper web strip outward.

6. An automatic paper-threading device for use in an angle bar section according to claim 5, wherein the paper guide of the tensioner is a bar-like member extending in the width direction of paper web and capable of pivoting between the standby position where the bar-like member does not interfere with the third paper-threading path and the projection position where an end portion of the bar-like member located on the side of the paper leader guide projects across the third paper-threading path.

7. An automatic paper-threading device for use in an angle bar section according to claim 6, wherein the tensioner further comprises control/drive means for causing the paper guide to project at an appropriate timing after a leading end of the second paper web strip has passed the second bar located downstream of the first bar in the angle bar section.

8. An automatic paper-threading device for use in an angle bar section according to claim 7, wherein the first paper leader and the first paper leader guide for the first paper web strip are those used for the paper web before being slit into the first and second paper web strips; and the second paper leader guide for the second paper web strip is provided such that the starting point thereof is located immediately downstream of the slitting unit and on the side of the cut side edge of the second paper web strip.

9. An automatic paper-threading device for use in an angle bar section according to claim 6, wherein the first paper leader and the first paper leader guide for the first paper web strip are those used for the paper web before being slit into the first and second paper web strips; and the second paper leader guide for the second paper web strip is provided such that the starting point thereof is located immediately downstream of the slitting unit and on the side of the cut side edge of the second paper web strip.

10. An automatic paper-threading device for use in an angle bar section according to claim 5, wherein the tensioner further comprises control/drive means for causing the paper guide to project at an appropriate timing after a leading end of the second paper web strip has passed the second bar located downstream of the first bar in the angle bar section.

11. An automatic paper-threading device for use in an angle bar section according to claim 10, wherein the first paper leader and the first paper leader guide for the first paper web strip are those used for the paper web before being slit into the first and second paper web strips; and the second paper leader guide for the second paper web strip is provided such that the starting point thereof is located immediately downstream of the slitting unit and on the side of the cut side edge of the second paper web strip.

12. An automatic paper-threading device for use in an angle bar section according to claim 5, wherein the first paper leader and the first paper leader guide for the first paper web strip are those used for the paper web before being slit into the first and second paper web strips; and the second paper leader guide for the second paper web strip is provided such that the starting point thereof is located immediately downstream of the slitting unit and on the side of the cut side edge of the second paper web strip.

* * * * *